| (12) | United States Patent | (10) Patent No.: | US 7,094,298 B2 |
|---|---|---|---|
| | Schwetz | (45) Date of Patent: | Aug. 22, 2006 |

(54) APPARATUS AND METHOD FOR WELDING OVERLAPPING WATER-PROOF MEMBRANES TO EACH OTHER

(75) Inventor: Joseph J. Schwetz, Attleboro, MA (US)

(73) Assignee: Sarnafil, Inc., Canton, MA (US)

( * ) Notice: Subject to any disclaimer, the term of this patent is extended or adjusted under 35 U.S.C. 154(b) by 136 days.

(21) Appl. No.: 10/782,709

(22) Filed: Feb. 19, 2004

(65) Prior Publication Data

US 2005/0183831 A1    Aug. 25, 2005

(51) Int. Cl.
  *B29C 65/02*    (2006.01)
  *B29C 65/18*    (2006.01)
  *B32B 37/10*    (2006.01)

(52) U.S. Cl. .......................... 156/71; 156/82; 156/391; 156/497; 156/499; 156/543; 156/574

(58) Field of Classification Search ........ 156/497–499, 156/574, 391, 71, 82, 544, 543, 579, 157, 156/578, 545, 564, 551, 575, 304.1
  See application file for complete search history.

(56) References Cited

U.S. PATENT DOCUMENTS

| 4,440,588 | A | * | 4/1984 | Stevenson et al. .......... 156/157 |
| 4,519,172 | A | | 5/1985 | Ristow |
| 4,744,855 | A | * | 5/1988 | Ellenberger et al. ........ 156/499 |
| 4,834,828 | A | | 5/1989 | Lopin et al. |
| 5,624,511 | A | * | 4/1997 | Lippman ..................... 156/64 |
| 5,935,357 | A | * | 8/1999 | Hubbard et al. .............. 156/82 |
| 6,187,122 | B1 | * | 2/2001 | Hubbard et al. .............. 156/82 |
| 6,325,126 | B1 | * | 12/2001 | Rubenacker et al. ........ 156/497 |
| 6,453,964 | B1 | | 9/2002 | Pfotenhauer et al. |
| 6,533,014 | B1 | | 3/2003 | Rubenacker et al. |
| 6,554,947 | B1 | | 4/2003 | Pfotenhauer et al. |
| 6,581,663 | B1 | | 6/2003 | Rubenacker et al. |
| 6,866,077 | B1 | * | 3/2005 | Zurmuhlee .................. 156/391 |

\* cited by examiner

*Primary Examiner*—Sue A. Purvis
(74) *Attorney, Agent, or Firm*—Pandiscio & Pandiscio; Scott R. Foster

(57) ABSTRACT

Apparatus for heat welding together thermoplastic membranes mounted on a surface includes a frame, a support member connected to the frame, a nozzle mounted on the support member to receive heated air, weld wheels mounted on the support member adjacent to, and immediately following, the nozzle for pushing a heated portion of an upper membrane toward a lower membrane to effect a weld, wherein the support member is adapted to be fixed to the frame member in a first position proximate a first side of the frame for welding the two membranes together, is releasable from the first position, is movable to a second position nearer a second side of the frame, and adapted to be releasably fixed to the frame at the second position for welding a membrane to an underlying edge piece mounted on a free edge of the surface.

23 Claims, 9 Drawing Sheets

APPARATUS AND METHOD FOR WELDING OVERLAPPING WATER-PROOF MEMBRANES TO EACH OTHER

BACKGROUND OF THE INVENTION

1. Field of the Invention

The invention relates to an apparatus for heat welding two overlapping waterproof membranes to each other, and is directed more particularly to such an apparatus provided with improved structure for welding along outside edges of the area to be covered with the membranes.

2. Description of the Prior Art

It is known to provide an apparatus for heat welding two overlapping waterproof membranes attached to a surface, such as a roof top, deck, terrace, or other surface. See, for example, U.S. Pat. No. 6,325,126, issued Dec. 4, 2001, to James Rubenacker et al.

The '126 patent relates to a machine for effecting continuous heat welds for binding an upper membrane to a lower membrane underlying in part the upper membrane. To effect the welds, the machine described in the '126 patent is provided with nozzle means which directs hot air onto the weld area. The upper overlapping membrane is heat sealed to the lower overlapped membrane along the overlap portion to seal the two membranes together. To effect the weld, the nozzle means is moved by the machine between the two membranes, under an edge of the upper membrane.

The aforementioned U.S. Pat. No. 6,325,126 (commonly owned by the assignee herein) is incorporated herein by reference.

While the apparatus shown and described in the '126 patent effects "field seam welding" quite well, that is, welding two membrane strips together, it is not well suited for welding the outboard-most strip outboard-most edge to an outer edge of the supporting roof, or other structure, that is, "edge welding". Such edge welding is customarily accomplished by a machine devoted wholly to edge welding, or done by hand. There is thus a need for a machine which is adapted for membrane field seam welding and, in addition, for edge welding in a quick and easy fashion.

SUMMARY OF THE INVENTION

It is, therefore, an object of the invention to provide a membrane welding machine having a quick-change structure which facilitates adapting the machine to perform a selected one of field seam welding and edge welding.

With the above and other objects in view, as will hereinafter appear, a feature of the present invention is the provision of an apparatus for heat welding to each other two overlapping thermoplastic membranes mounted on a surface. The apparatus includes a frame having drive wheels mounted thereon for locomotion of the frame, and a support member connected to the frame. A nozzle is mounted on the support member and is adapted to receive heated air from a heat source mounted on the frame, the nozzle being adapted to direct the heated air to a weld location beneath an upper one of the membranes. Weld wheels are mounted on the support member and mounted adjacent to, and in operation immediately following, the nozzle for pushing a heated portion of the upper one of the membranes toward the surface to effect a weld. The support member is adapted to be fixed to the frame member in a first position proximate a first side of the frame for welding the two membranes together, is adapted for release from the first position, is movable on the frame to a second position nearer a second side of the frame, and is adapted to be releasably fixed to the frame at the second position for welding one of the membranes to an underlying edge piece mounted on a free edge of the surface.

In accordance with a further feature of the invention, there is provided an apparatus for heat welding to each other two overlapping thermoplastic membranes mounted on a surface and for heat welding one of the membranes to an angle piece disposed on a free edge of the surface. The apparatus includes drive wheels for providing for locomotion of the apparatus and adapted to be disposed in a first location on the apparatus for the welding of the two overlapping membranes to each other, a nozzle adapted to be disposed in a first location on the apparatus for directing heated air to a weld area between the two membranes, and weld wheels adapted to be disposed in a first location on the apparatus for the welding of the two membranes to each other. At least one of the drive wheels, the nozzle, and the weld wheels are each movable to a second location on the apparatus for the welding of the one membrane to the angle piece.

In accordance with a further feature of the invention, there is provided a method for welding an edge of a thermoplastic strip to an angle piece fixed on a free edge of a surface to which thermoplastic strips are being attached. The method includes the steps of providing an apparatus for heat welding to each other two overlapping thermoplastic membranes mounted on a surface, the apparatus including a frame, a support member connected to the frame, a nozzle mounted on the support member and adapted to direct heated air to a weld location beneath an upper one of the membranes, weld wheels mounted on the support member adjacent to, and in operation immediately following, the nozzle for pushing a heated portion of the upper one of the membranes toward the surface to effect a weld, wherein the support member is adapted to be fixed to the frame in a first position proximate a first side of the frame for welding the two membranes together, releasing the support member from the first position, moving the support member from the first position to a second position on the frame nearer a second side of the frame, releasably fixing the support member on the frame in the second position, placing an angle piece on the surface free edge, the angle piece having a coating of a plastics material on an upper surface thereof, and moving the apparatus along the edge of one of the thermoplastic strips with the nozzle disposed between the one thermoplastic strip and the coating on the angle iron, whereby to weld the thermoplastic strip edge to the angle piece upper surface.

In accordance with a still further feature of the invention, there is provided a method for heat welding to each other two overlapping thermoplastic membranes mounted on a surface and for heat welding one of the membranes to an angle piece mounted on a free edge of the surface. The method includes the steps of laying the two membranes on the surface such that edge portions of the two membranes overlap. Providing an apparatus including drive wheels for providing for locomotion of the apparatus and adapted to be disposed in a first location on the apparatus for the welding of the two overlapping membranes to each other, a nozzle adapted to be disposed in a first location on the apparatus for directing heated air to a weld area between the two membranes, and weld wheels adapted to be disposed in a first location on the apparatus for the welding of the two membranes to each other. At least one of the drive wheels, the nozzle, and the weld wheels are each movable to a second location on the apparatus for the welding of the one membrane to the angle piece. Placing the drive wheels, nozzle, and weld wheels in the first locations thereof, moving the apparatus along the overlap of the two membranes, such that the nozzle directs heated air between the two membranes and the weld wheels thereafter press the two membranes firmly together, placing the angle piece on the free edge of the surface, moving the at least one drive wheel, nozzle, and weld wheels to their second locations, and moving the apparatus along an outboard edge of the one membrane such that the nozzle directs heated air between the one membrane and the angle piece and the weld wheels thereafter press the one membrane and the angle piece firmly together.

The above and other features of the invention, including various novel details of construction and combinations of parts and method steps, will now be more particularly described with reference to the accompanying drawings and pointed out in the claims. It will be understood that the particular apparatus and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
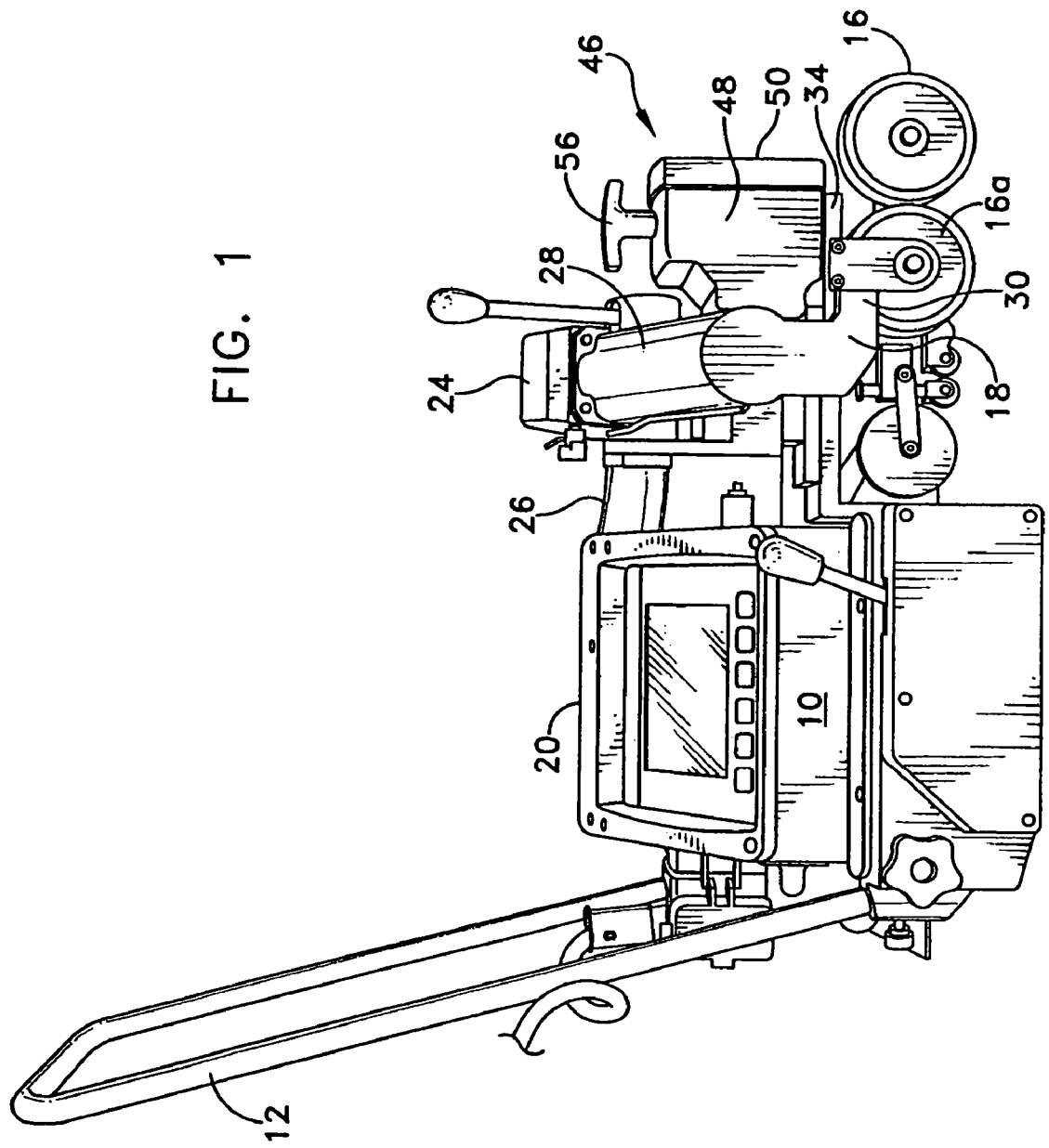
FIG. 1 is a left side substantially elevational view of one form of apparatus illustrative of an embodiment of the invention.

Referring to FIGS. 1-4, it will be seen that a welding apparatus of the type referred to hereinabove includes a frame 10 to which is fixed a handle 12 and on which are mounted drive wheels 14 and weld wheels 16. A hot air nozzle 18 is supported on the frame 10 for directing heated air to an area immediately forward of, and proximate to, the leading weld wheel 16a. A housing 20 is mounted on the frame 10 for enclosing a motor 22 (FIG. 4), a blower (not shown) and various electrical components and controls (not shown). The nozzle 18 is fixed to a heating element 24 which, in turn, is connected to a flexible conduit 26 which is in communication with the blower carried by the frame 10.

In operation for the usual purpose of effecting field seams, the nozzle 18 is positioned between overlapped edge portions of two membranes. The motor 22 drives the drive wheels 14, thereby driving the apparatus forwardly, the forward end of the apparatus being the end having the handle 12 thereon. The blower forces air through the conduit 26, through the heating element 24, and through the nozzle 18. As the apparatus moves along, a jet of hot air from the nozzle 18 is directed between the membranes. Immediately following hot air impingement on the membranes, the weld wheels 16 press the upper membrane against the lower membrane to secure the membranes together.

The nozzle 18 extends from a tubular chamber 28 which receives the heated air at a selected temperature. The nozzle 18 comprises in part a hollow, generally flat, blade-like portion 30 at a discharge end of the chamber 28.

As may be seen in the aforementioned '126 patent, the nozzle may be provided with two outlet portions, not shown herein but illustrated in the '126 patent, incorporated herein by reference. The two outlets direct two streams of heated air in spaced, generally parallel paths, typically on opposite sides of a fastener means by which the lower membrane is mechanically secured to the surface being covered with the thermoplastic membranes.

The weld wheels 16 may be free-wheeling, or may be driven so as to serve the purposes of both drive wheels and weld wheels. In the embodiment illustrated, for example, the leading weld wheel 16a is also a drive wheel, while the trailing weld wheel is free-wheeling and serves simply as a weld wheel.

Figure 4:
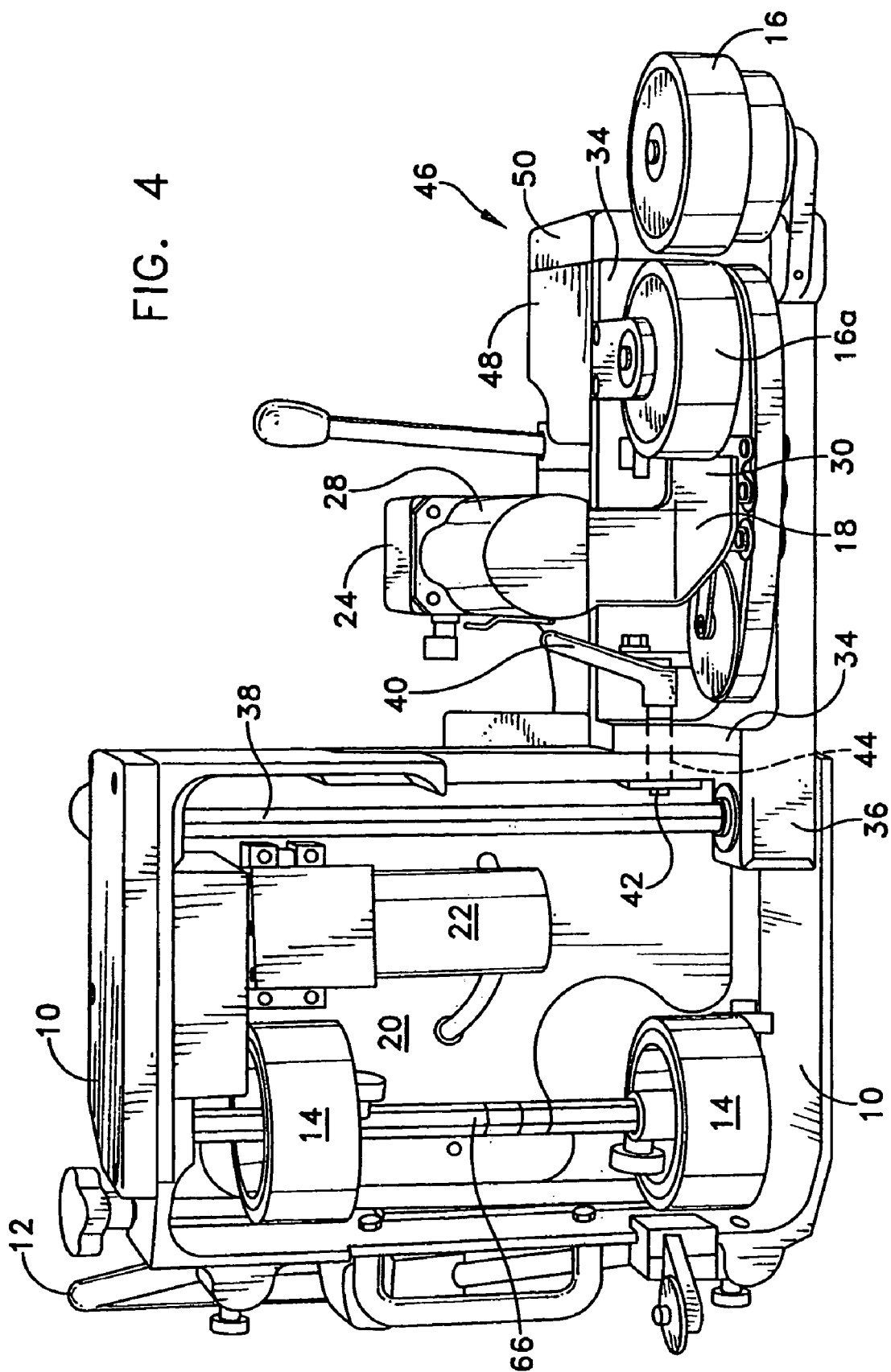
FIG. 4 is a substantially bottom view.

The conduit 26 receives air from the blower in the housing 20. A portion of the conduit 26, the heating element 24, the chamber 28, the nozzle 18, and the weld wheels 16 are mounted on a support member 34. The support member 34 includes a lug portion 36 which is slidably mounted on a rod 38 fixed in the frame 10 (FIG. 4). A handle 40 is fixed to a threaded shaft 42 which extends through a treaded bore 44 which extends through a portion of the support member 34 and a portion of the frame 10. The shaft 42 is thus movable into engagement with the rod 38 to lock the support member 34 in a selected location on the frame 10.

Figure 7:
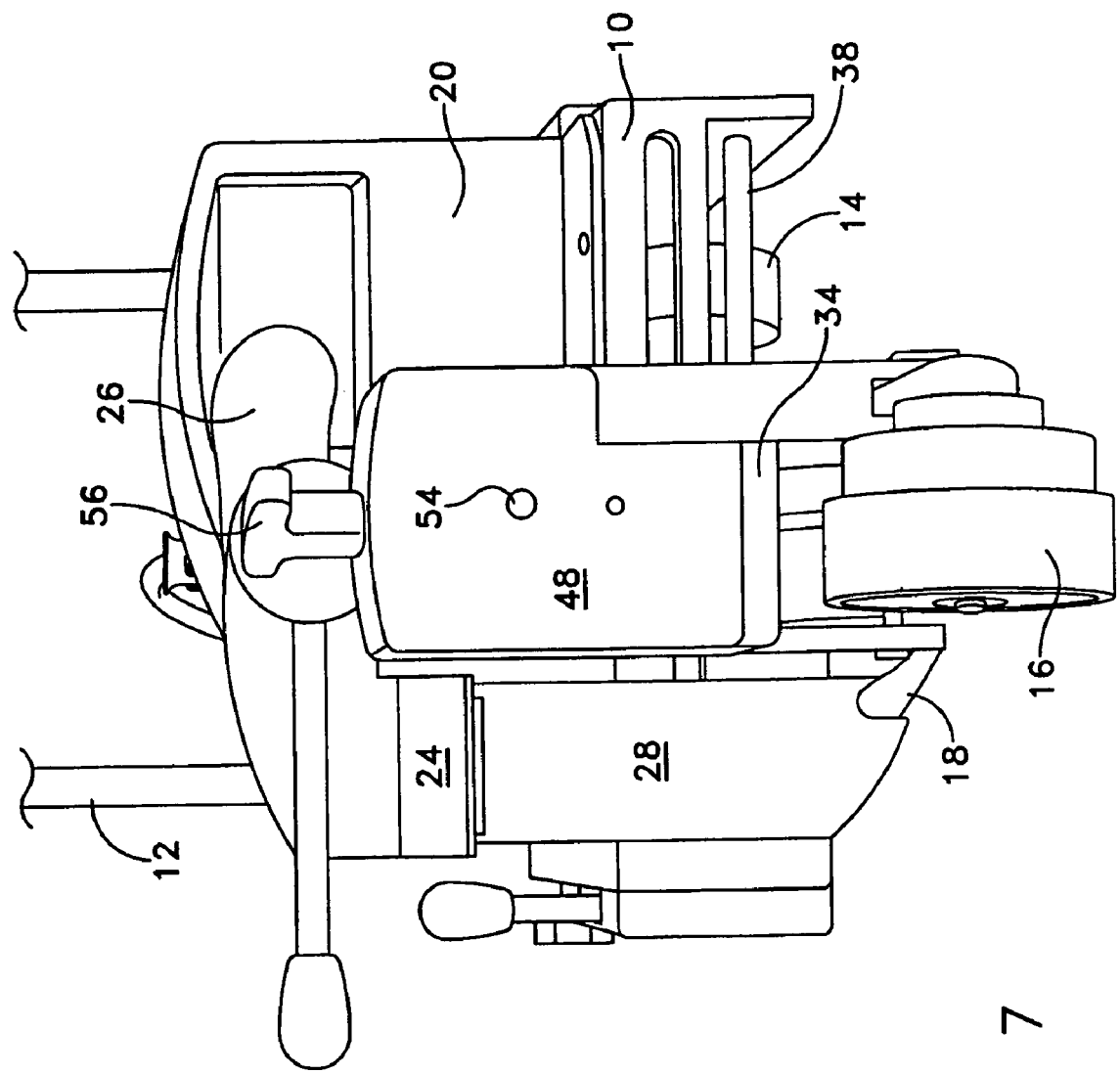
FIG. 7 is a front substantially elevational view of the apparatus, showing the shifted components in their shifted positions.
Figure 8:
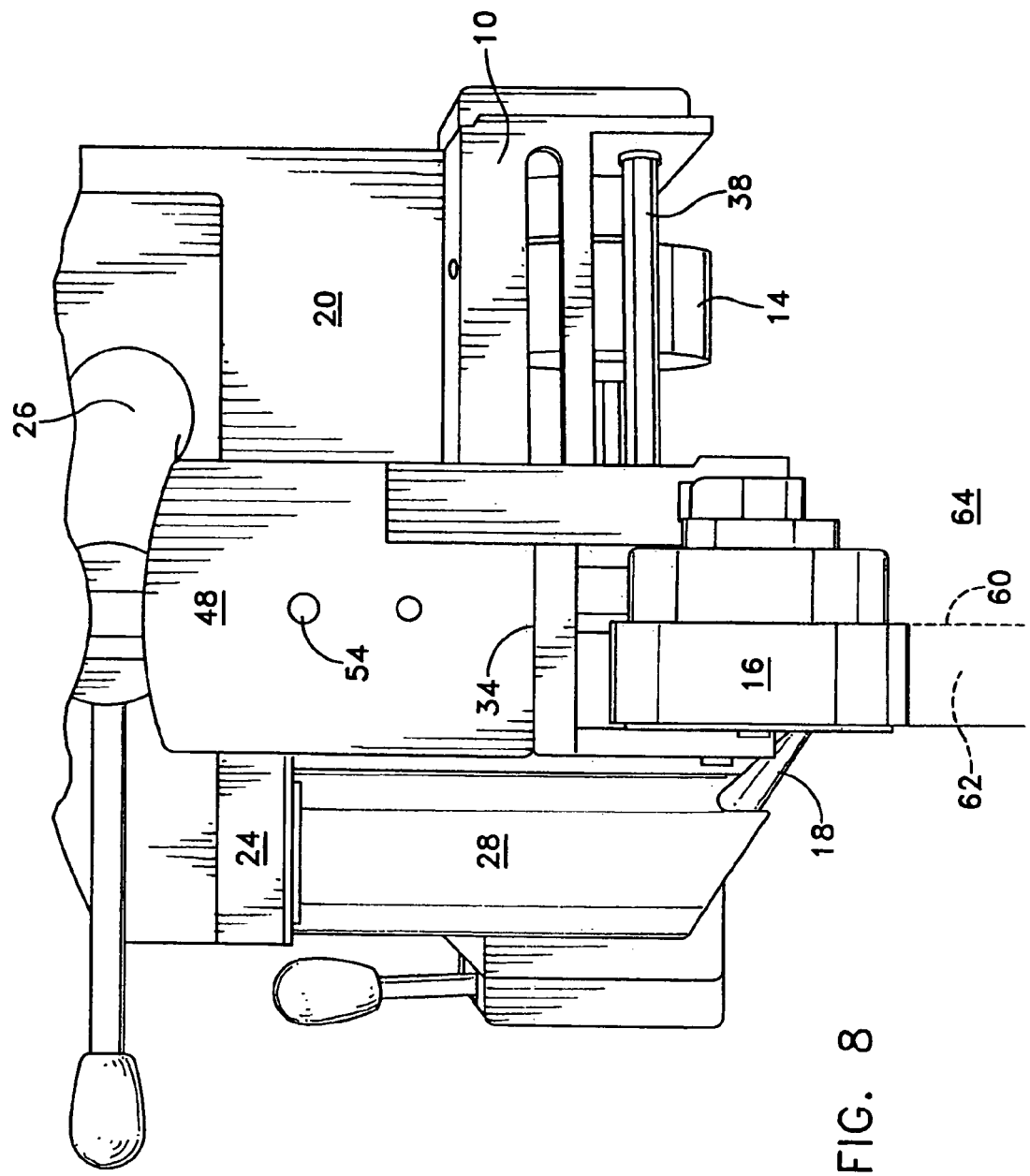
FIG. 8 is a front elevational view of a portion of the apparatus disposed along a free edge portion of a surface being operated upon.

Mounted on the support member 34 is a weight assembly 46 including first and second weights 48, 50 (FIGS. 1 and 3) which serve to push the weld wheels 16 downwardly into firm contact with just-heated thermoplastic strip portions. The first and second weights 48, 50 are releasably connected to each other by a threaded shaft extending from a knob 52 (FIG. 3), through a bore in the second weight and into a bore 54 in the first weight 48 (FIGS. 7 and 8). The weight assembly 46 is similarly releasably connected to the support member 34 by a threaded shaft extending from a grip member 56 (FIG. 1).

Figure 9:
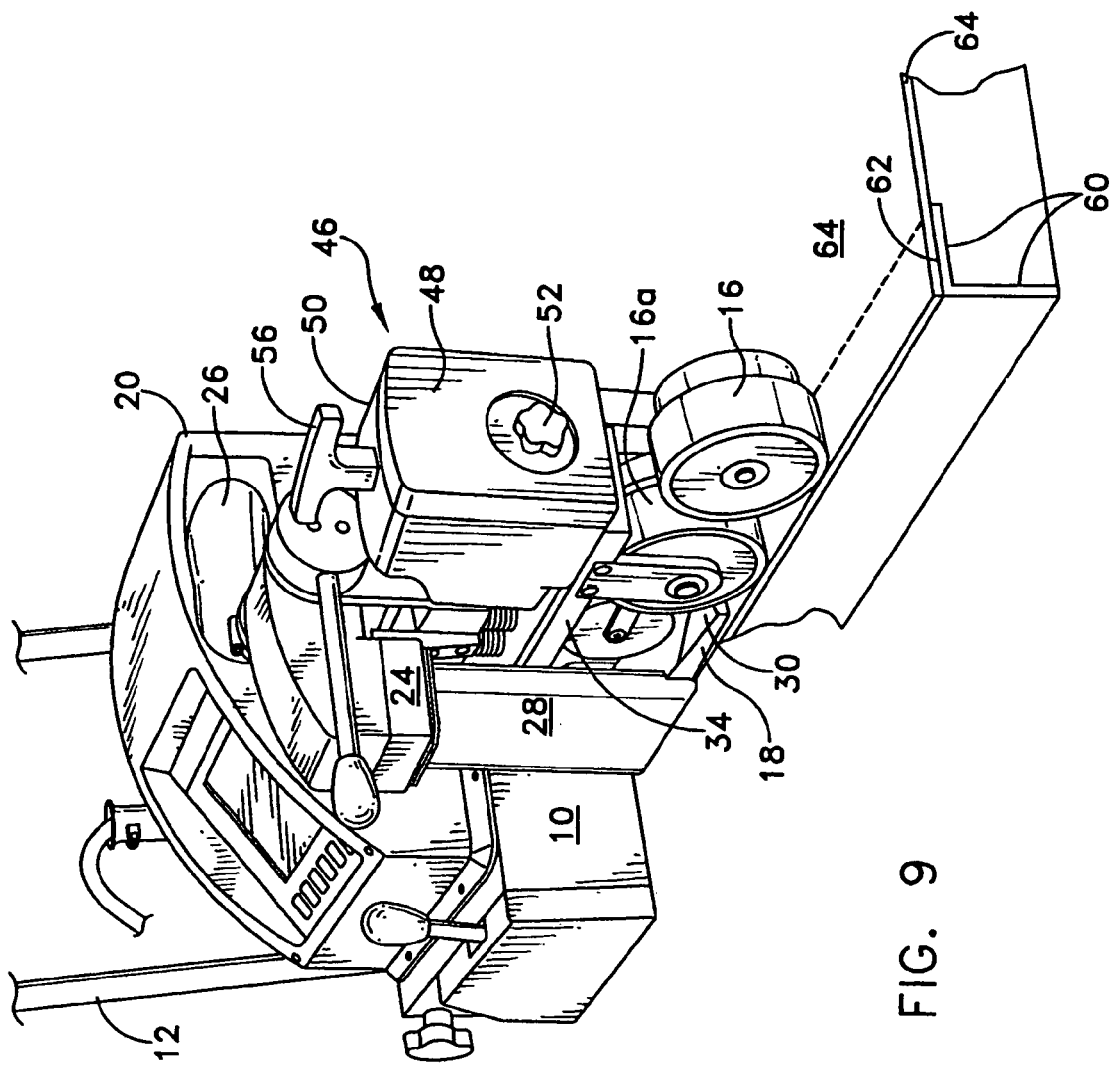
FIG. 9 is similar to FIG. 3, but showing the apparatus disposed along the edge of a structure, with shifted components positioned for edge welding.

To facilitate welding an outboard-most thermoplastic strip to the free edge of the surface, the edge is covered by an angle piece 60, usually of metal, and having an upper surface 62 thereof covered with a coating of plastics material, such as PVC. A thermoplastic membrane 64 is laid over the coating, as shown in FIG. 9.

The apparatus, as shown in FIG. 1, if applied to the edge weld in the same fashion as applied to a field seam weld, will fall from the surface inasmuch as a large portion of the apparatus overhangs the surface edge and is unsupported. Given that the surface being treated is quite often a roof or other elevated surface, a fall can be not only destructive to property but a hazard to safety, and leaving the intended task unaccomplished. For such reasons, the edge welding is done typically either by hand or by a further machine designed specifically for edge welding.

Figure 5:
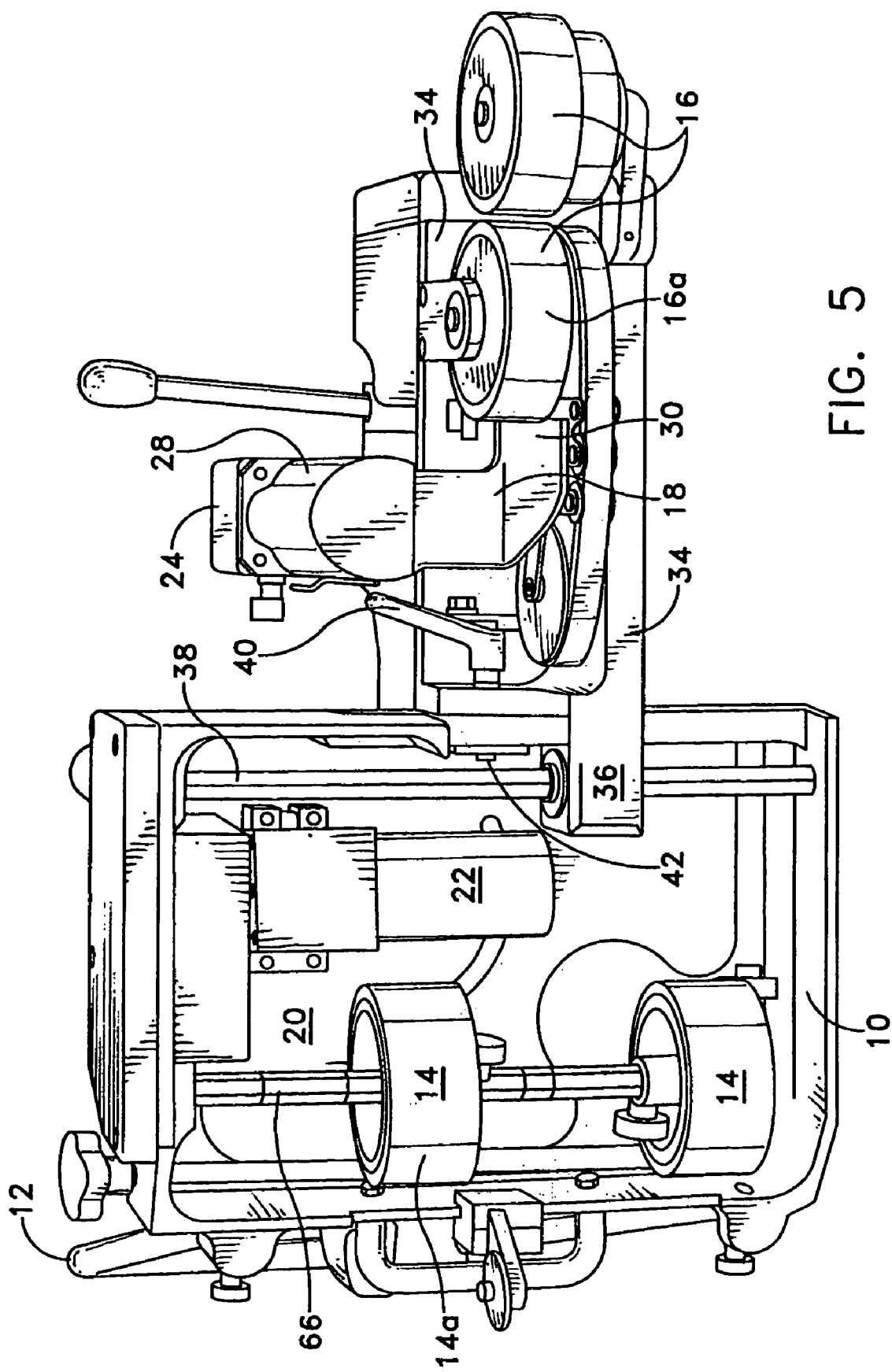
FIG. 5 is similar to FIG. 4, but showing parts in shifting positions.
Figure 6:
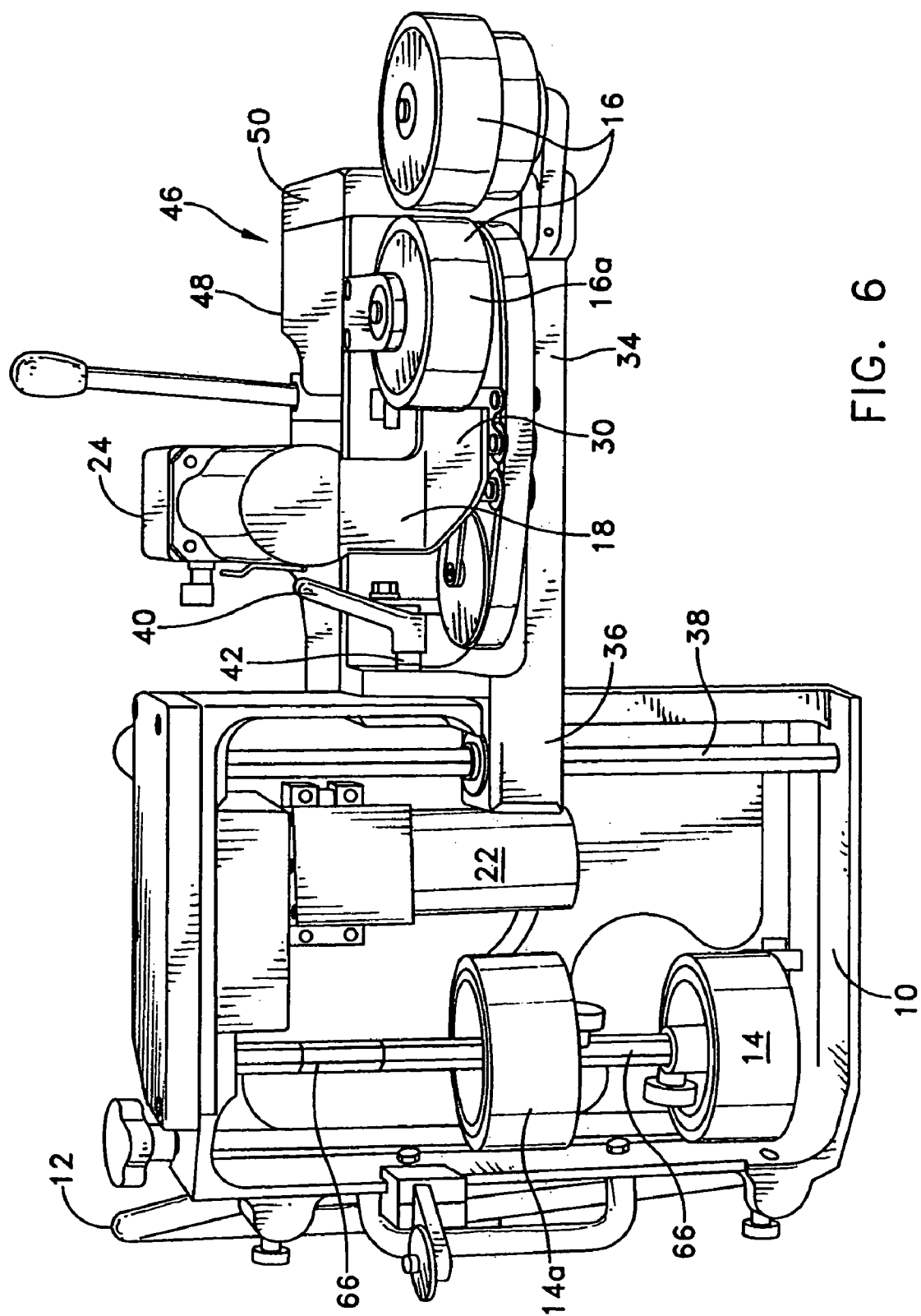
FIG. 6 is a similar to FIG. 5, but showing the shifting parts of FIG. 5 fully shifted to a further location on the apparatus.

Referring to FIGS. 4 and 5, it will be seen that by manual manipulation of the handle 40, the shaft 42 is movable from engagement with the rod 38, to permit the support member lug portion 36 to be moved along the rod from the position shown in FIG. 4 through the position shown in FIG. 5, and on to the position shown in FIG. 6, at which point the shaft 42 is again brought to bear on the rod 38 to lock the support member 34 in the location shown in FIGS. 6 and 7.

The flexible character of the conduit 26 permits movement of the support member 34 on the frame 10 without interruption of air flow from the blower in the housing 20 to the heating element 24, chamber 28, and nozzle 18.

Figure 2:
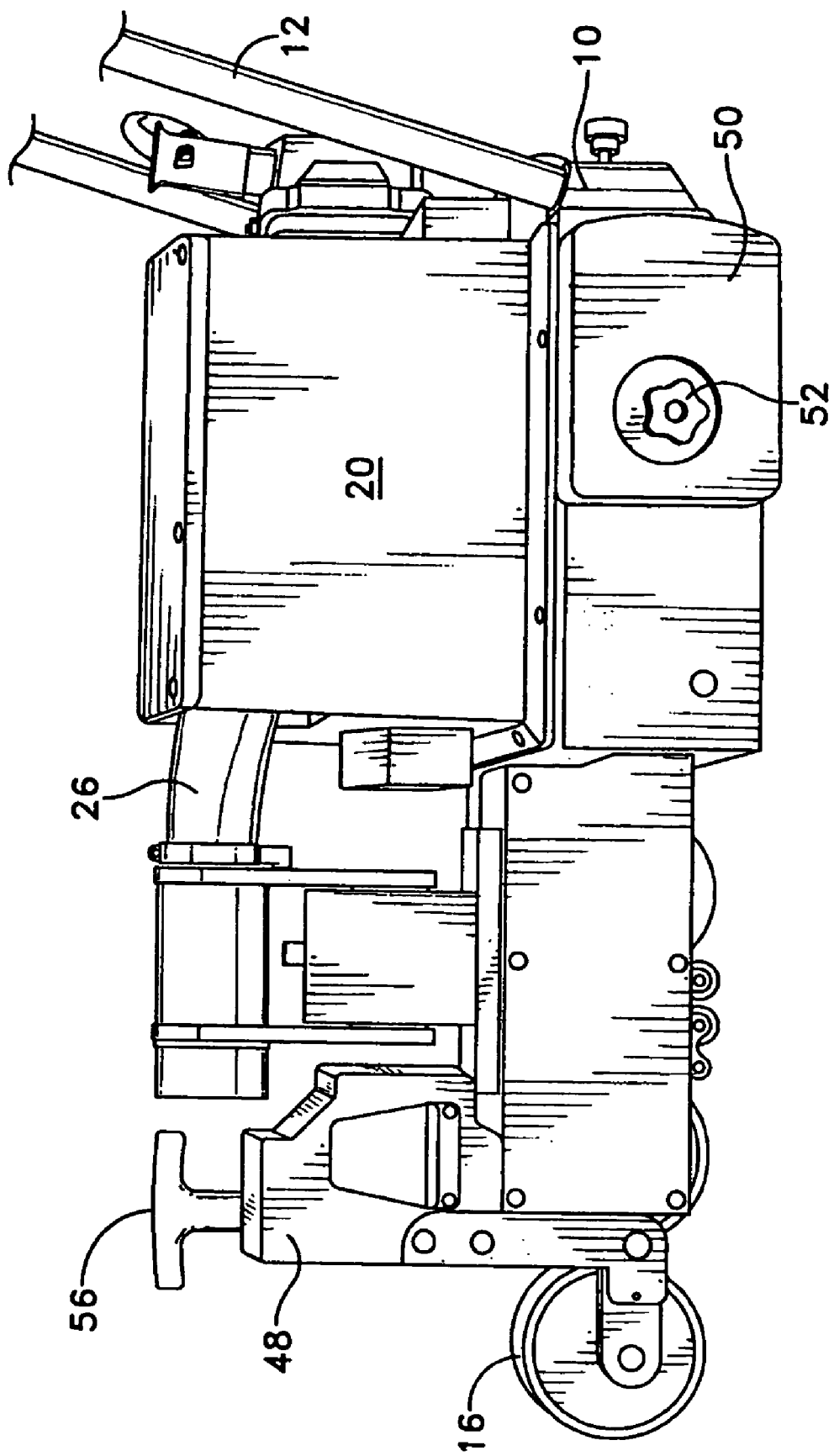
FIG. 2 is a right side substantially elevational view of the apparatus of FIG. 1.
Figure 3:
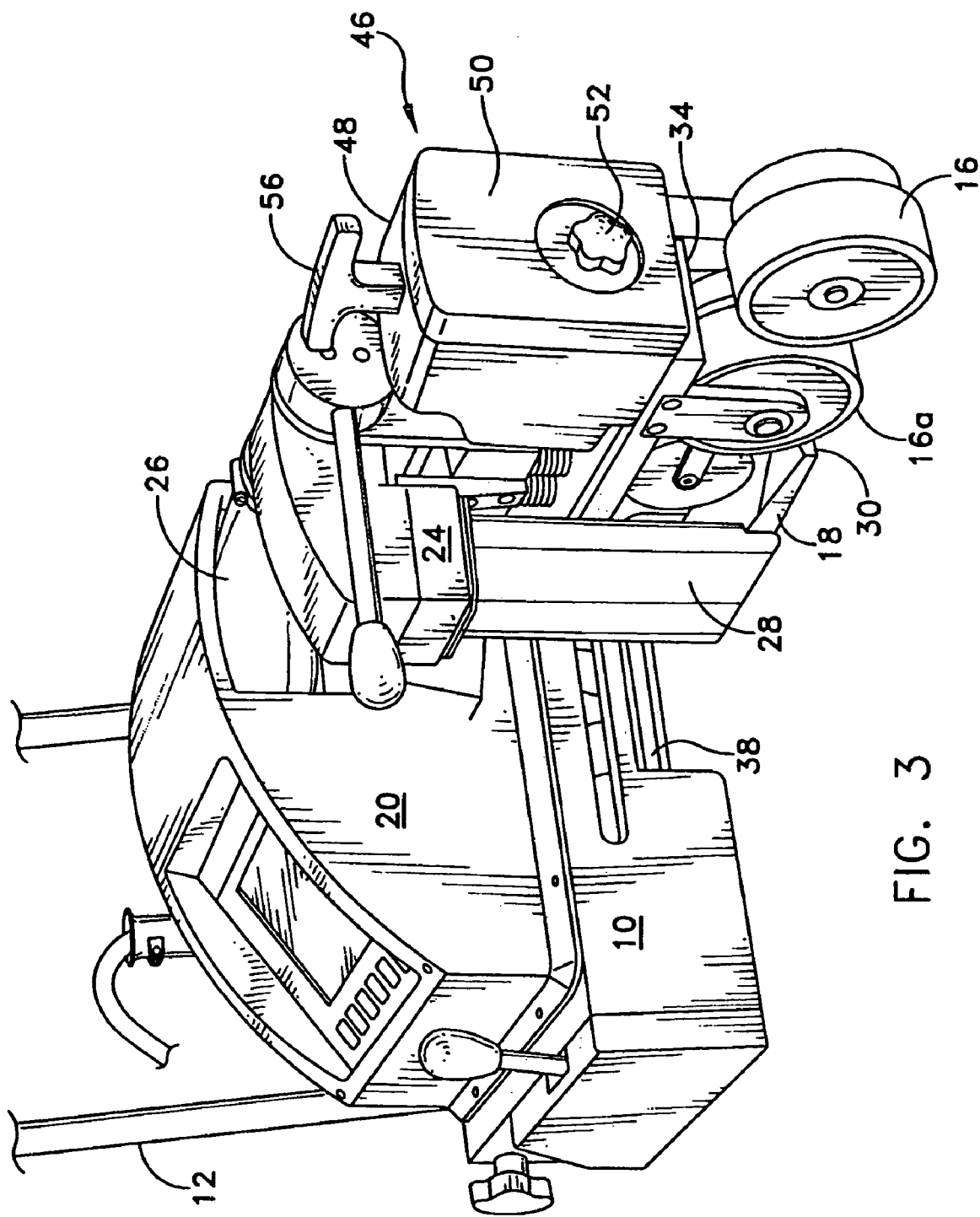
FIG. 3 is a generally front and left side perspective view.

In addition to moving the support member 34 widthwise on the frame 10, the weight 50 is removed by manipulation of the knob 52 from the position shown in FIG. 1, where the weight 50 comprises a portion of the weight assembly 46, and placed in the position shown in FIG. 2, where the weight 50 adds to the inboard weight of the apparatus.

Referring to FIG. 4, it will be seen that the drive wheels 14 are mounted on an axle 66 in a side-by-side manner. One of the drive wheels 14a (FIG. 5) is movable on the axle 66 closer to the other drive wheel, such that the drive wheels can be close together (FIG. 6) and in operation disposed on the thermoplastic membrane 64. The movable wheel 14a is thus moved from an outboard position to a more central position to better support the frame 10 in an edge welding operation.

As shown in FIGS. 8 and 9, the apparatus, as reconfigured, is moved along the edge of the surface, such that the nozzle 18 directs heated air between the thermoplastic membrane 64 and the PVC layer on the upper surface of the angle piece 60. The weld wheels 16 immediately follow to press the heated membrane 64 into firm engagement with the angle piece 60, to weld the two together.

The reconfiguration of the apparatus requires very simple mechanical operations and only a few minutes time.

There is thus provided an apparatus and method which enables the use of a machine for effecting field seam welds to be further useful in effecting edge welds, and requiring minimal reconfiguration time and effort.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. Apparatus for heat welding to each other two overlapping thermoplastic membranes mounted on a surface, the apparatus comprising:
   a frame having drive wheels mounted thereon for locomotion of said frame;
   a support member connected to said frame;
   a nozzle mounted on said support member and adapted to receive heated air from a heat source mounted on said frame, said nozzle being adapted to direct the heated air to a weld location between the two membranes;
   weld wheels mounted on said support member and mounted adjacent to, and in operation immediately following, said nozzle for pushing a heated portion of the upper one of the membranes toward the underlying membrane to effect a weld;
   wherein said support member is adapted to be fixed to said frame member in a first position proximate a first side of said frame for welding the two membranes together, is adapted for release from the first position, is movable on said frame to a second position nearer a second side of said frame, and adapted to be releasably fixed to said frame at the second position for welding one of the membranes to an underlying edge piece mounted on a free edge of the surface.

2. The apparatus in, accordance with claim 1 wherein said nozzle and said weld wheels are movable from a fixed position proximate the one side of said frame toward the second side of said frame for releasable fixation in a position nearer the second side of said frame.

3. The apparatus in accordance with claim 2 wherein said nozzle and said weld wheels are movable widthwise of the apparatus.

4. The apparatus in accordance with claim 3 and further comprising a rod fixed in said frame and extending widthwise thereof, a portion of said support member being slidably mounted on said rod.

5. The apparatus in accordance with claim 4 and further comprising a lock structure for releasably locking said support member portion on said rod at a selected location.

6. The apparatus in accordance with claim 3 and further comprising a weight member selectively mountable on said support member for welding the two membranes together and on said frame for the welding of one of the membranes to the underlying edge piece.

7. The apparatus in accordance with claim 1 wherein one of said weld wheels further comprises a drive wheel.

8. The apparatus in accordance with claim 1 wherein the drive wheels are mounted side by side on a single axle in said frame.

9. The apparatus in accordance with claim 8 wherein one of the drive wheels is movable from a fixed position proximate one side of said frame toward the second side of said frame, the one drive wheel being releasably fixable in a second position nearer the second side of said frame.

10. The apparatus in accordance with claim 9 wherein the drive wheel second position is proximate a mid-portion of the axle.

11. The apparatus in accordance with claim 9 wherein another of the drive wheels is disposed proximate an inboard end of the axle.

12. A method for welding an edge of a thermoplastic membrane to an angle piece fixed on a free edge of a surface to which thermoplastic membranes are being attached, the method comprising the steps of:
   providing an apparatus for heat welding to each other two overlapping thermoplastic membranes mounted on a surface, the apparatus comprising:
      a frame;
      a support member connected to said frame;
      a nozzle mounted on said support member and adapted to direct heated air to a weld location beneath an upper one of the membranes;
      weld wheels mounted on said support member adjacent to, and in operation immediately following, said nozzle for pushing a heated portion of the upper one of the membranes toward the underlying one of the membranes to effect a weld;
      wherein said support member is adapted to be fixed to said frame member in a first position proximate a first side of said frame for welding the two membranes together;
   releasing said support member from the first position;
   moving said support member from the first position to a second position on said frame nearer a second side of said frame;
   releasably fixing said support member on said frame in the second position;

placing an angle piece on the surface free edge, the angle piece having a coating of a plastics material on an upper surface thereof; and moving the apparatus along the edge of one of the thermoplastic membranes with said nozzle disposed between the one thermoplastic membrane and the coating on the angle piece, whereby to weld the thermoplastic membrane edge to the angle piece upper surface.

13. The method in accordance with claim 12 wherein the apparatus further comprises drive wheels mounted on an axle disposed in said frame, a first of the drive wheels being mounted on the axle proximate an inboard end of the axle, and a second of the drive wheels being releasably fixed on the axle proximate an outboard end of the axle, the method comprising the further step of moving the second drive wheel on the axle toward the first drive wheel and releasably fixing the second drive wheel nearer the first drive wheel.

14. The method in accordance with claim 13 wherein the step of releasably fixing the second drive wheel comprises fixing the second drive wheel proximate a mid-portion of the axle.

15. The method in accordance with claim 13 wherein the step of moving the second drive wheel comprises moving the second drive wheel widthwise of said frame.

16. The method in accordance with claim 15 wherein the step of moving the second drive wheel comprises moving the second drive wheel to a mid-portion of the axle.

17. The method in accordance with claim 12 wherein the apparatus further comprises weights mounted on said support member, and the method includes the further step of removing one of said weights from said support member, and attaching the removed weight to an inboard portion of said frame.

18. The method in accordance with claim 12 wherein the step of moving said support member comprises moving said support member widthwise of said frame.

19. The method in accordance with claim 12 wherein the second position on said frame comprises a mid-portion of said frame.

20. The method in accordance with claim 12 wherein the step of moving the apparatus along the edge of the one thermoplastic membrane further comprises moving said weld wheels serially along the edge of the one thermoplastic membrane to press the one thermoplastic membrane against the coating on the angle piece upper surface.

21. Apparatus for heat welding to each other two overlapping thermoplastic membranes mounted on a surface and for heat welding one membrane to an angle piece disposed on a free edge of the surface, the apparatus comprising:

drive wheels for providing for locomotion of the apparatus;

a support member mounted on said apparatus adapted to be disposed in a first location on the apparatus for directing heated air from a nozzle mounted thereon to a weld area between the two membranes, and for a weld wheel mounted thereon to be disposed in a first location on the apparatus for the welding of the two membranes to each other; and said support member, and therewith said nozzle and said weld wheel, being movable to a second location on the apparatus to position said nozzle and said weld wheel for the welding of the one membrane to the angle piece.

22. The apparatus in accordance with claim 21, wherein said drive wheels are adapted to be disposed in a first location on the apparatus for the welding of the two overlapping membranes to each other, and at least one of said drive wheels is movable to a second location for the welding to the angle piece.

23. A method for heat welding to each other two overlapping thermoplastic membrane mounted on a surface and for heat welding one membranes to an angle piece mounted on a free edge of the surface, the method comprising the steps of:

laying the two membranes on the surface such that edge portions of the two membranes overlap;

providing an apparatus comprising:

drive wheels for providing for locomotion of the apparatus;

a support member adapted to be disposed in a first location on the apparatus;

a nozzle disposed on the support member for directing heated air to a weld area between the two membranes when the support member is in the first location; and a weld wheel disposed on the support member for the welding of the two membranes to each other when the support member is in the first location;

at least one of the drive wheels, and the support member each being movable to a second location on the apparatus for the welding of the one membrane to the angle piece;

placing the drive wheel in the first location;

moving the apparatus along the overlap of the two membranes, such that the nozzle directs heated air between the two membranes and the weld wheel thereafter presses the two membranes firmly together;

placing the angle piece on the free edge of the surface;

moving the support member and the at least one drive wheel to second locations on the apparatus; and moving the apparatus along an outboard edge of the one membrane such that the nozzle directs heated air between the one membrane and the angle piece and the weld wheel thereafter presses the one membrane and the angle piece firmly together.

* * * * *